United States Patent
Tochio et al.

(10) Patent No.: US 11,456,452 B2
(45) Date of Patent: Sep. 27, 2022

(54) POSITIVE ELECTRODE FOR NON-AQUEOUS ELECTROLYTE SECONDARY BATTERY AND NON-AQUEOUS ELECTROLYTE SECONDARY BATTERY

(71) Applicant: Panasonic Intellectual Property Management Co., Ltd., Osaka (JP)

(72) Inventors: Takaya Tochio, Osaka (JP); Kaoru Nagata, Osaka (JP); Takeshi Ogasawara, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 102 days.

(21) Appl. No.: 16/471,950

(22) PCT Filed: Dec. 14, 2017

(86) PCT No.: PCT/JP2017/044811
§ 371 (c)(1),
(2) Date: Jun. 20, 2019

(87) PCT Pub. No.: WO2018/123603
PCT Pub. Date: Jul. 5, 2018

(65) Prior Publication Data
US 2019/0386299 A1    Dec. 19, 2019

(30) Foreign Application Priority Data
Dec. 28, 2016  (JP) .................... 2016-256408

(51) Int. Cl.
*H01M 4/36*    (2006.01)
*H01M 4/131*   (2010.01)
(Continued)

(52) U.S. Cl.
CPC .......... *H01M 4/366* (2013.01); *H01M 4/131* (2013.01); *H01M 4/525* (2013.01); *H01M 4/62* (2013.01);
(Continued)

(58) Field of Classification Search
CPC .......... H01M 4/36; H01M 4/525; H01M 4/62; H01M 4/131
See application file for complete search history.

(56) References Cited

U.S. PATENT DOCUMENTS

2006/0166091 A1* 7/2006 Deguchi .......... H01M 10/0567
429/199
2007/0082265 A1    4/2007 Itou et al.
(Continued)

FOREIGN PATENT DOCUMENTS

| CN | 102496710 A | 6/2012 |
| JP | 2005-190996 A | 7/2005 |

(Continued)

OTHER PUBLICATIONS

International Search Report dated Feb. 20, 2018, issued in counterpart application No. PCT/JP2017/044811 (2 pages).

(Continued)

*Primary Examiner* — Kenneth J Douyette
(74) *Attorney, Agent, or Firm* — WHDA, LLP (57) ABSTRACT

A positive electrode for a non-aqueous electrolyte secondary battery contains a first particle and a second particle. The first particle contains an electrochemically active positive-electrode active material, and the positive-electrode active material contains a lithium transition metal oxide. The second particle contains an electrochemically inactive metal oxide. An electrochemically inactive phosphate adheres to the surface of the second particle.

9 Claims, 1 Drawing Sheet

(51) Int. Cl.
*H01M 4/525* (2010.01)
*H01M 4/62* (2006.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 2008/0063941 A1 | 3/2008 | Itaya et al. | |
| 2010/0291439 A1* | 11/2010 | Phillips | H01M 4/0404 429/226 |
| 2011/0062378 A1* | 3/2011 | Chang | H01M 4/366 252/182.1 |
| 2012/0052394 A1 | 3/2012 | Tanaka et al. | |
| 2016/0013473 A1* | 1/2016 | Ishiguchi | H01M 4/587 429/231.4 |
| 2016/0293936 A1 | 10/2016 | Takebayashi | |
| 2017/0141441 A1 | 5/2017 | Niina et al. | |

FOREIGN PATENT DOCUMENTS

| | | |
|---|---|---|
| JP | 2008-71569 A | 3/2008 |
| JP | 2008-159560 A | 7/2008 |
| JP | 2010-40383 A | 2/2010 |
| JP | 2010-129470 A | 6/2010 |
| JP | 2012-49060 A | 3/2012 |
| JP | 2015-15169 A | 1/2015 |
| JP | 2015-103332 A | 6/2015 |
| WO | 2016/017073 A1 | 2/2016 |
| WO | 2016/121350 A1 | 8/2016 |

OTHER PUBLICATIONS

English Translation of Search Report dated Jul. 23, 2021, issued in counterpart CN Application No. 201780071698.8. (3 pages).

* cited by examiner

POSITIVE ELECTRODE FOR NON-AQUEOUS ELECTROLYTE SECONDARY BATTERY AND NON-AQUEOUS ELECTROLYTE SECONDARY BATTERY

TECHNICAL FIELD

The present invention relates primarily to an improvement in a positive electrode of a non-aqueous electrolyte secondary battery.

BACKGROUND ART

In recent years, non-aqueous electrolyte secondary batteries, particularly lithium-ion secondary batteries, have been expected as power supplies for small-scale consumer applications, power storage apparatuses, and electric vehicles due to their high voltages and high energy densities. In non-aqueous electrolyte secondary batteries, positive electrodes containing a lithium transition metal oxide as a positive-electrode active material have been extensively studied.

For example, it has been proposed that the surface of particles of a lithium transition metal oxide containing Co as a main component is covered with an oxide containing Li and Ni to improve cycle characteristics (see Patent Literature 1). It has also been proposed that a silicic acid compound is adhered to a lithium transition metal oxide containing Ni as a main component and is subjected to heat treatment to decrease gas evolution during high-temperature storage (see Patent Literature 2).

CITATION LIST

Patent Literature

PTL 1: Japanese Published Unexamined Patent Application No. 2008-159560
PTL 2: Japanese Published Unexamined Patent Application No. 2010-129470

SUMMARY OF INVENTION

Solution to Problem

When a non-aqueous electrolyte secondary battery (in a charged state) is stored in a high-temperature environment, a non-aqueous electrolyte may be oxidatively decomposed. Oxidative decomposition of a non-aqueous electrolyte is accompanied by reduction of a positive-electrode active material and thereby decreases the battery capacity. The techniques described in Patent Literature 1 and Patent Literature 2 cannot prevent the decrease in battery capacity during high-temperature storage.

In view of such situations, a positive electrode for a non-aqueous electrolyte secondary battery according to one aspect of the present disclosure contains a first particle and a second particle. The first particle contains an electrochemically active positive-electrode active material, and the positive-electrode active material contains a lithium transition metal oxide. The second particle contains an electrochemically inactive metal oxide. An electrochemically inactive phosphate adheres to the surface of the second particle.

A non-aqueous electrolyte secondary battery according to another aspect of the present disclosure includes the positive electrode, a negative electrode, and a non-aqueous electrolyte.

The present disclosure can provide a positive electrode that can reduce the decrease in capacity of a non-aqueous electrolyte secondary battery during high-temperature storage.

DESCRIPTION OF EMBODIMENTS

A positive electrode for a non-aqueous electrolyte secondary battery according to an embodiment of the present invention contains a first particle and a second particle. The first particle is an electrochemically active positive-electrode active material, and the positive-electrode active material contains a lithium transition metal oxide. The second particle is an electrochemically inactive metal oxide (not reversibly contributing to a charge-discharge reaction). An electrochemically inactive phosphate (not reversibly contributing to a charge-discharge reaction) adheres to the surface of the second particle.

The second particle to which the phosphate adheres can reduce the decrease in capacity of the non-aqueous electrolyte secondary battery (in a charged state) due to degradation of the positive-electrode active material during storage in a high-temperature environment. More specifically, in oxidative decomposition of a non-aqueous electrolyte during high-temperature storage, selective reduction of the phosphate adhering to the surface of the second particle suppresses the reduction of the positive-electrode active material. The crystal structure of the positive-electrode active material is also maintained without destabilization due to the reduction of the positive-electrode active material. Although detailed reasons are not clear, a large potential difference between the first particle (positive-electrode active material) with a high electric potential during charging and the second particle with a low electric potential not contributing to charging tends to result in oxidative decomposition of the non-aqueous electrolyte concentrated between the first particle and the second particle. This probably efficiently causes selective reduction of the phosphate adhering to the second particle with a low electric potential.

The proportion of phosphate adhering to the surface of the second particle in the positive electrode is preferably higher than the proportion of phosphate adhering to the surface of the first particle. More preferably, most of the phosphate in the positive electrode adheres to the surface of the second particle. In this case, the second particle to which the phosphate adheres has a sufficient effect of reducing the decrease in battery capacity during high-temperature storage. If most of the phosphate between the first particle and the second particle, between which oxidative decomposition of the non-aqueous electrolyte tends to occur predominantly during high-temperature storage, adheres to the surface of the second particle, even when part of the phosphate is in contact with the first particle, the decrease in battery capacity during high-temperature storage can be sufficiently reduced.

When the battery in a charged state is stored in a high-temperature environment, the second particle to which the phosphate adheres suppresses the reduction reaction of the positive-electrode active material, which is an exothermic reaction, and thereby suppresses heat generation in the positive electrode.

The phosphate contains an alkali metal, such as Li, Na, or K, or an alkaline-earth metal, such as Mg or Ca. Examples of the phosphate include lithium phosphate, sodium phosphate, potassium phosphate, magnesium phosphate, and calcium phosphate. Among these, the phosphate is preferably lithium phosphate in order to prevent the degradation of the positive-electrode active material.

Examples of the lithium transition metal oxide of the first particle include $Li_aCoO_2$, $Li_aNiO_2$, $Li_aMnO_2$, $Li_aCo_bNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMePO_4$, and $Li_2MePO_4F$. M denotes at least one selected from the group consisting of Na, Mg, Sc, Y, Mn, Fe, Co, Ni, Cu, Zn, Al, Cr, Pb, Sb, and B. Me includes at least a transition element (for example, at least one selected from the group consisting of Mn, Fe, Co, and Ni). a=0 to 1.2, b=0 to 0.9, and c=2.0 to 2.3. The mole ratio a of lithium is the value immediately after the production of the active material and increases or decreases by charging and discharging.

To increase the capacity, the lithium transition metal oxide preferably contains Ni. The Ni content of the lithium transition metal oxide is preferably 80% or more by mole of the total amount of metallic elements other than lithium contained in the lithium transition metal oxide. A lithium transition metal oxide containing Ni has relatively low crystal structure stability and thermal stability, and the positive-electrode active material tends to degrade during high-temperature storage. This enhances the effect of preventing the degradation of the positive-electrode active material due to the second particle to which a phosphate adheres.

Among lithium transition metal oxides containing Ni, $Li_aNi_xCo_yAl_zO_2$ (0≤a≤1.2, 0.8≤x<1.0, 0<y≤0.2, 0<z≤0.05, x+y+z=1) is preferred. Ni with x of 0.8 or more can increase the capacity. Co with y of 0.2 or less can increase the crystal structure stability of the lithium transition metal oxide while maintaining high capacity. Al with z of 0.05 or less can increase the thermal stability of the lithium transition metal oxide while maintaining the output characteristics.

The metal oxide of the second particle is preferably an oxide that is a raw material of the first particle. In this case, the lithium transition metal oxide of the first particle and the metal oxide of the second particle contain the same transition metal as a main component. Like the lithium transition metal oxide of the first particle, the metal oxide of the second particle contains at least one selected from the group consisting of Ni, Co, Mn, Al, Ti, Fe, Mo, W, Cu, Zn, Sn, Ta, V, Zr, Nb, Mg, Ga, In, La, and Ce, for example. Among these, the metal oxide preferably contains Ni, more preferably Ni, Co, and Al. The Ni content of the metal oxide is preferably 80% or more by mole of the total amount of metallic elements contained in the metal oxide. When the metal oxide of the second particle contains Ni, lithium phosphate that adheres to the surface of the second particle is more likely to be selectively reduced in the oxidative decomposition of the non-aqueous electrolyte, thereby further decreasing the degradation of the positive-electrode active material. Although detailed reasons are not clear, it is surmised that a relatively high electric potential of the metal oxide containing Ni has an influence.

When the first particle and the second particle contain the same transition metal with the same chemical properties as a main component, the degradation of the positive-electrode active material can be sufficiently prevented without inhibiting the selective reduction of lithium phosphate that adheres to the surface of the second particle. Furthermore, the use of a raw material of the first particle suppresses side reactions in the battery and tends to stabilize charge-discharge characteristics.

The phrase "a metal oxide contains a transition metal as a main component" means that the fraction (mole fraction) of the transition metal in the metal oxide is the highest of the fractions of metallic elements contained in the metal oxide. The phrase "a lithium transition metal oxide contains a transition metal as a main component" means that the fraction (mole fraction) of the transition metal in the lithium transition metal oxide is the highest of the fractions of metallic elements other than lithium contained in the lithium transition metal oxide.

The second particle preferably has a BET specific surface area in the range of 10 to 100 $m^2/g$ and a sphericity of 0.8 or more. Such a second particle is porous and has pores with a size appropriate to incorporate a phosphate into the pores (for example, with an average pore size in the range of 10 to 100 nm). In such a second particle, a portion of the second particle exposed to the outside has a relatively small surface area, and the interior (pores) of the second particle has a relatively large surface area.

The second particle with the particular BET specific surface area and sphericity can easily incorporate a phosphate into the interior (pores) of the second particle and easily hold the phosphate. A phosphate also adheres to the interior (pores) of the second particle, and therefore the effect of preventing the degradation of the positive-electrode active material can be consistently produced. Such a second particle can also easily incorporate an alkaline component remaining on the surface of the lithium transition metal oxide (first particle) into the interior (pores) of the second particle. Incorporation of an alkaline component remaining on the surface of the lithium transition metal oxide can decrease gas evolution due to the alkaline component during charging and discharging or during high-temperature storage. The alkaline component results from a lithium source used in the synthesis of the lithium transition metal oxide. The metal oxide of the second particle before incorporation of an alkaline component is almost free of the alkaline component.

The sphericity of the second particle is represented by $4\pi S/L_a^2$ (wherein S denotes the area of the orthogonal projection image of the second particle, and $L_a$ denotes the perimeter of the orthogonal projection image of the second particle). The sphericity of the second particle can be measured, for example, by the image processing of a scanning electron microscope (SEM) photograph of the second particle. The sphericities of randomly selected 100 particles are averaged.

The positive electrode preferably contains a mixture of the first particles and the second particles to which a phosphate adheres. In the positive electrode, preferably, the first particles and the second particles to which a phosphate adheres are almost uniformly dispersed and are mixed together. The appropriate presence of the second particles to which a phosphate adheres around the first particles can efficiently prevent the degradation of the positive-electrode active material (first particles).

The average particle size P1 of the first particles and the average particle size P2 of the second particles preferably satisfy the relational expression:

$$0.8 \leq P2/P1 \leq 1.2$$

When P2/P1 is within this range, the first particles and the second particles are easily mixed together, and the appropriate presence of the second particles to which a phosphate adheres around the first particles can efficiently prevent the degradation of the positive-electrode active material (first particles).

The first particles preferably have an average particle size in the range of 2 to 30 μm. In this case, the first particles and the second particles to which a phosphate adheres are easily uniformly mixed together and can thereby efficiently prevent the degradation of the positive-electrode active material (first particles). The first particles with an average particle size of 30 μm or less can have a sufficiently increased utilization rate of the positive-electrode active material (first particles).

The second particles preferably have an average particle size in the range of 2 to 35 μm. In this case, the first particles and the second particles to which a phosphate adheres are easily uniformly mixed together and can thereby efficiently prevent the degradation of the positive-electrode active material (first particles). Each average particle size of the first particles and the second particles is the median size in the particle size distribution on a volume basis.

The total amount of metallic elements in the metal oxide (second particle) preferably ranges from 0.01% to 0.5% by mole of the total amount of metallic elements other than lithium contained in the lithium transition metal oxide (first particle). When the total amount of metallic elements in the metal oxide is 0.01% or more by mole of the total amount of metallic elements other than lithium contained in the lithium transition metal oxide, the second particle to which a phosphate adheres can have a sufficiently enhanced effect of preventing the degradation of the positive-electrode active material (first particle). Even when the total amount of metallic elements in the metal oxide is more than 0.5% by mole of the total amount of metallic elements other than lithium contained in the lithium transition metal oxide, this cannot further enhance the effect. The amount of the metal oxide (second particle) in the positive electrode can be small and therefore has no influence on the loading weight (positive-electrode capacity) of the positive-electrode active material (first particle) in the positive electrode.

The phosphorus content of a phosphate that adheres to the surface of the second particle preferably ranges from 0.01% to 1% by mole of the total amount of metallic elements other than lithium contained in the lithium transition metal oxide. When the phosphorus content of a phosphate that adheres to the surface of the second particle is 0.01% or more by mole of the total amount of metallic elements other than lithium contained in the lithium transition metal oxide, the second particle to which the phosphate adheres can have a sufficiently enhanced effect of preventing the degradation of the positive-electrode active material. When the phosphorus content of a phosphate that adheres to the surface of the second particle is 1% or less by mole of the total amount of metallic elements other than lithium contained in the lithium transition metal oxide, the initial discharge capacity can be sufficiently increased.

A mixture of the first particles and the second particles to which a phosphate adheres can be produced by the following method, for example. First, the second particles are dispersed in aqueous phosphoric acid to prepare a dispersion liquid of the second particles to which phosphoric acid adheres. The first particles are then added to the dispersion liquid and are stirred. An alkaline component (including lithium) remaining on the surface of the first particles (lithium transition metal oxide) dissolves in the dispersion liquid and reacts with phosphoric acid adhering to the surface of the second particles, thereby forming lithium phosphate. Subsequently, the mixture of the first particles and the second particles to which lithium phosphate adheres is removed, for example, by filtration and is dried. When the second particles have the particular BET specific surface area and sphericity (are porous), the second particles can easily incorporate phosphoric acid into their interiors (pores), and phosphoric acid in the aqueous solution adheres mostly to the second particles. The second particles can also easily incorporate an alkaline component into their interiors (pores), and therefore most of the lithium phosphate adheres easily to the second particles.

An alkaline component remaining on the surface of the lithium transition metal oxide is eluted during the formation of lithium phosphate. This decreases gas evolution during charging and discharging or during high-temperature storage caused by the alkaline component remaining on the surface of the lithium transition metal oxide. The alkaline component results from a lithium source used in the synthesis of the lithium transition metal oxide.

A mixture of the first particles and the second particles to which a phosphate adheres is not necessarily produced by the method described above and may be produced by another method. For example, after the second particles to which a phosphate adheres are prepared, the second particles to which a phosphate adheres may be mixed with the first particles. The second particles to which a phosphate adheres are produced, for example, by dispersing the second particles in an aqueous solution of the phosphate, filtering the second particles, and drying the second particles. The second particles to which a phosphate adheres and the first particles are preferably mixed in a dispersion medium, such as water. In this case, the mixture of the second particles to which a phosphate adheres and the first particles may be removed by filtration and then dried.

When the second particles are formed of a metal oxide, the second particles can be produced, for example, by the following method.

Aqueous sodium hydroxide is added dropwise to an aqueous solution (for example, aqueous sulfuric acid) containing a predetermined metallic element while stirring, thereby forming a precipitate. The precipitate is removed by filtration, is washed, and is dried. The precipitate is then ground to prepare a metal hydroxide containing a predetermined metallic element. The metal hydroxide is fired in the air or in an oxygen atmosphere under predetermined conditions (first firing) to prepare a metal oxide (second particles). The first firing temperature ranges from 500° C. to 1200° C., for example. The first firing time ranges from 10 to 24 hours, for example. Porous second particles to which a phosphate can easily adhere (that can easily incorporate phosphoric acid and an alkaline component) are produced by the first firing.

The sphericity of the second particles can be controlled by changing the stirring speed in the formation of the precipitate, for example. The BET specific surface area of the second particles can be controlled, for example, by changing the stirring speed and the firing temperature in the formation of the precipitate.

The type and component ratio of metallic elements in the metal oxide of the second particles are preferably the same as the type and component ratio of metallic elements other than lithium contained in the lithium transition metal oxide of the first particles. In this case, the metal oxide of the second particles can also be used in the synthesis of the lithium transition metal oxide (the formation of the first particles). This is advantageous in terms of productivity. The P2/P1 ratio of the average particle size P2 of the second particles to the average particle size P1 of the first particles can be easily adjusted in the range of 0.8 to 1.2.

When the type and component ratio of metallic elements in the metal oxide of the second particles are the same as the type and component ratio of metallic elements other than lithium contained in the lithium transition metal oxide (first particles), the first particles can be formed by the following method, for example.

A lithium source, such as lithium hydroxide, lithium carbonate, or lithium oxide, is added to the metal oxide (second particles) to prepare a mixture. The first firing temperature of the second particles preferably ranges from 500° C. to 800° C. The mixture is fired in an oxygen atmosphere under predetermined conditions (second firing) to prepare the lithium transition metal oxide (first particles). The second firing temperature ranges from 500° C. to 850° C., for example. The second firing time ranges from 10 to 24 hours, for example. After the second firing, the first particles may be washed with water and dried.

A non-aqueous electrolyte secondary battery according to an embodiment of the present invention will be described below. The non-aqueous electrolyte secondary battery includes a positive electrode, a negative electrode, and a non-aqueous electrolyte.

[Positive Electrode]

The positive electrode includes a positive-electrode current collector and a positive-electrode mixture layer formed on the surface of the positive-electrode current collector, for example. The positive-electrode mixture layer can be formed by applying a positive electrode slurry, which contains a positive-electrode mixture dispersed in a dispersion medium, to the surface of the positive-electrode current collector and drying the positive electrode slurry. The dried film may be rolled, if necessary. The positive-electrode mixture layer may be formed on one or both surfaces of the positive-electrode current collector.

The positive-electrode mixture contains, as essential components, the first particles (positive-electrode active material), the second particles to which a phosphate adheres (metal oxide), and a binder, and can contain an electrically conductive agent and/or a thickener as an optional component.

Examples of the binder include resin materials, for example, fluoropolymers, such as polytetrafluoroethylene and poly(vinylidene difluoride) (PVDF); polyolefin resins, such as polyethylene and polypropylene; polyamide resins, such as aramid resins; polyimide resins, such as polyimides and polyamideimides; acrylic resins, such as poly(acrylic acid), poly(methyl acrylate), and ethylene-acrylic acid copolymers; vinyl resins, such as polyacrylonitrile and poly(vinyl acetate); polyvinylpyrrolidone; polyethersulfone; and rubber materials, such as styrene-butadiene copolymer rubber (SBR). These may be used alone or in combination.

Examples of the electrically conductive agent include graphite, such as natural graphite and artificial graphite; carbon black, such as acetylene black; electrically conductive fibers, such as carbon fibers and metal fibers; fluorocarbons; metal powders, such as aluminum; electrically conductive whiskers, such as zinc oxide and potassium titanate; electrically conductive metal oxides, such as titanium oxide; and electrically conductive organic materials, such as phenylene derivatives. These may be used alone or in combination.

Examples of the thickener include cellulose derivatives such as, carboxymethylcellulose (CMC), modified products thereof (including salts, such as Na salts), and methylcellulose (cellulose ethers, etc.); saponified products of polymers having a vinyl acetate unit, such as poly(vinyl alcohol); and polyethers (poly(alkylene oxide)s, such as poly(ethylene oxide), etc.). These may be used alone or in combination.

The positive-electrode current collector may be a nonporous electrically conductive substrate (metal foil, etc.) or a porous electrically conductive substrate (mesh, net, punching sheet, etc.). The material of the positive-electrode current collector is stainless steel, aluminum, an aluminum alloy, or titanium, for example. The positive-electrode current collector may have any thickness, for example, in the range of 3 to 50 μm.

Examples of the dispersion medium include, but are not limited to, water, alcohols, such as ethanol, ethers, such as tetrahydrofuran, amides, such as dimethylformamide, N-methyl-2-pyrrolidone (NMP), and mixed solvents thereof.

[Negative Electrode]

The negative electrode includes a negative-electrode current collector and a negative-electrode mixture layer formed on the surface of the negative-electrode current collector, for example. The negative-electrode mixture layer can be formed by applying a negative electrode slurry, which contains a negative-electrode mixture dispersed in a dispersion medium, to the surface of the negative-electrode current collector and drying the negative electrode slurry. The dried film may be rolled, if necessary. The negative-electrode mixture layer may be formed on one or both surfaces of the negative-electrode current collector.

The negative-electrode mixture contains a negative-electrode active material as an essential component and can contain a binder, an electrically conductive agent, and/or a thickener as an optional component.

For example, the negative-electrode active material contains a carbon material that electrochemically adsorbs and desorbs lithium ions. Examples of the carbon material include graphite, easily graphitizable carbon (soft carbon), and non-graphitizable carbon (hard carbon). Among these, graphite is preferred due to its high charge-discharge stability and low irreversible capacity. Graphite means a material with a graphite crystal structure and includes natural graphite, artificial graphite, and graphitized mesophase carbon particles, for example. These carbon materials may be used alone or in combination.

The negative-electrode current collector may be a nonporous electrically conductive substrate (metal foil, etc.) or a porous electrically conductive substrate (mesh, net, punching sheet, etc.). The material of the negative-electrode current collector is stainless steel, nickel, a nickel alloy, copper, or a copper alloy, for example. The thickness of the negative-electrode current collector is preferably, but not limited to, in the range of 1 to 50 μm, more preferably 5 to 20 μm, from the perspective of the balance between the strength and weight reduction of the negative electrode.

The binder, thickener, and dispersion medium may be those exemplified for the positive electrode. The electrically conductive agent may be those exemplified for the positive electrode except graphite.

[Non-Aqueous Electrolyte]

The non-aqueous electrolyte contains a non-aqueous solvent and a lithium salt dissolved in the non-aqueous solvent. The concentration of lithium salt in the non-aqueous electrolyte ranges from 0.5 to 2 mol/L, for example. The non-aqueous electrolyte may contain a known additive agent.

Examples of the non-aqueous solvent include cyclic carbonates, chain carbonates, and cyclic carboxylates. The cyclic carbonate may be propylene carbonate (PC) or ethylene carbonate (EC). The linear carbonate may be diethyl carbonate (DEC), ethyl methyl carbonate (EMC), or dimethyl carbonate (DMC). The cyclic carboxylate may be γ-butyrolactone (GBL) or γ-valerolactone (GVL). These non-aqueous solvents may be used alone or in combination.

Examples of the lithium salt include lithium salts of chlorine-containing acids ($LiClO_4$, $LiAlCl_4$, $LiB_{10}Cl_{10}$, etc.), lithium salts of fluorine-containing acids ($LiPF_6$, $LiBF_4$, $LiSbF_6$, $LiAsF_6$, $LiCF_3SO_3$, $LiCF_3CO_2$, etc.), lithium salts of fluorine-containing acid imides (LiN$(CF_3SO_2)_2$, $LiN(CF_3SO_2)$ $(C_4F_9SO_2)$, $LiN(C_2F_5SO_2)_2$, etc.), and lithium halides (LiCl, LiBr, LiI, etc.). These lithium salts may be used alone or in combination.

[Separator]

It is usually desirable that a separator be disposed between the positive electrode and the negative electrode. The separator has high ion permeability and appropriate mechanical strength and insulating properties. The separator may be a microporous thin film, woven fabric, or nonwoven fabric. The material of the separator is preferably a polyolefin, such as polypropylene or polyethylene.

A non-aqueous electrolyte secondary battery according to an embodiment includes an electrode assembly and a non-aqueous electrolyte in a housing. The electrode assembly includes a roll of a positive electrode and a negative electrode with a separator interposed therebetween. Alternatively, another electrode assembly, such as a layered electrode assembly, may be used instead of the wound electrode assembly. The layered electrode assembly includes a positive electrode and a negative electrode stacked with a separator interposed therebetween. The non-aqueous electrolyte secondary battery may be of any type, for example, of a cylindrical, square or rectangular, coin, button, or laminate type.

Figure 1:
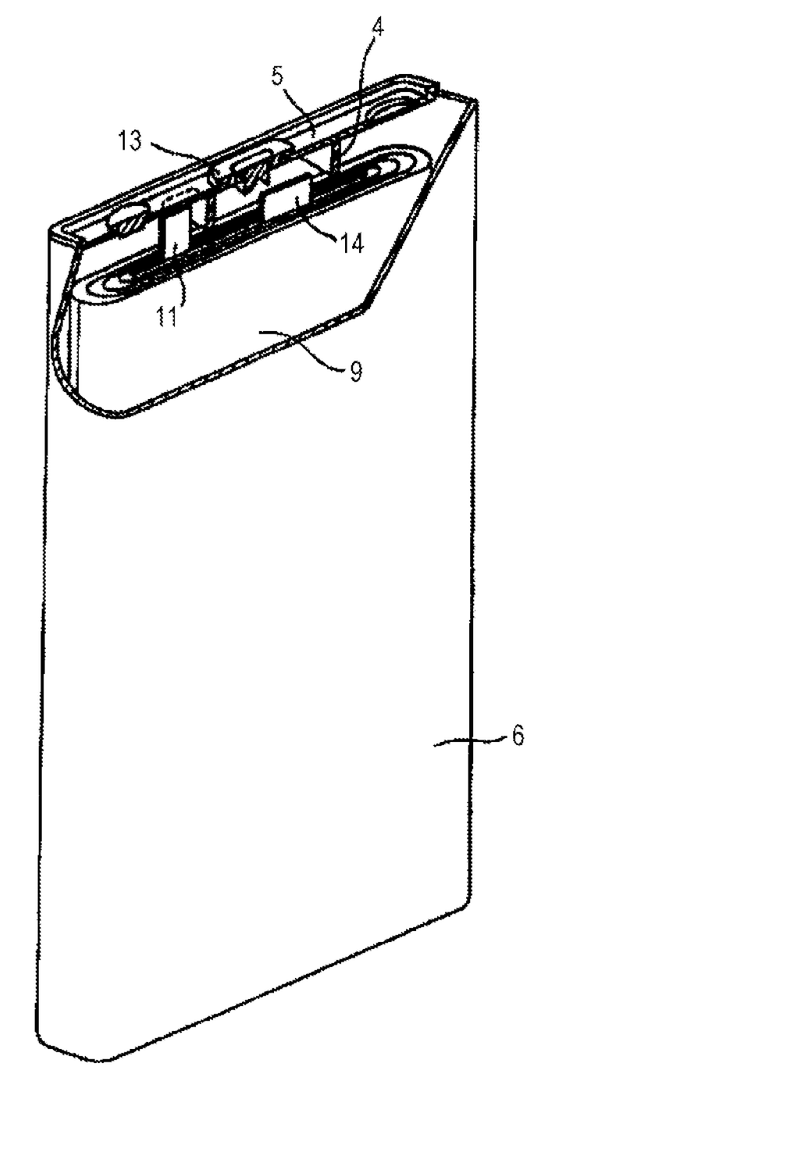
FIG. 1 is a schematic partly cutaway perspective view of a non-aqueous electrolyte secondary battery according to an embodiment of the present invention.

FIG. 1 is a schematic partly cutaway perspective view of a rectangular non-aqueous electrolyte secondary battery according to an embodiment of the present invention.

The battery includes a closed-end rectangular battery case 6, an electrode assembly 9 housed in the battery case 6, and a non-aqueous electrolyte (not shown). The electrode assembly 9 includes a long belt-like negative electrode, a long belt-like positive electrode, and a separator, which is disposed between the negative electrode and the positive electrode and prevents the direct contact between the negative electrode and the positive electrode. The electrode assembly 9 is formed by winding the negative electrode, the positive electrode, and the separator around a flat core and removing the core.

The negative-electrode current collector in the negative electrode is attached to one end of a negative-electrode lead 11, for example, by welding. The positive-electrode current collector in the positive electrode is attached to one end of a positive-electrode lead 14, for example, by welding. The other end of the negative-electrode lead 11 is electrically connected to a negative-electrode terminal 13 disposed on a sealing plate 5. The other end of the positive-electrode lead 14 is electrically connected to the battery case 6, which also serves as a positive-electrode terminal. A resin frame 4 for isolating the electrode assembly 9 from the sealing plate 5 and isolating the negative-electrode lead 11 from the battery case 6 is disposed on the top of the electrode assembly 9. The opening of the battery case 6 is sealed with the sealing plate 5.

EXAMPLES

Although the present invention will be more specifically described with the following examples and comparative examples, the present invention should not be limited to the examples.

Example 1

[Preparation of Second Particles]

Nickel sulfate hexahydrate ($NiSO_4 \cdot 6H_2O$), cobalt sulfate heptahydrate ($CoSO_4 \cdot 7H_2O$), and aluminum sulfate hexadecahydrate ($Al_2(SO_4)_3 \cdot 16H_2O$) were mixed at a Ni, Co, and Al atomic ratio of 0.91:0.06:0.03 and were dissolved in water. Aqueous sodium hydroxide was then added dropwise to the aqueous solution of the mixture while stirring at a predetermined stirring speed to form a precipitate. The precipitate was removed by filtration, was washed, and was dried. The precipitate was then ground to prepare a metal hydroxide ($Ni_{0.91}Co_{0.06}Al_{0.03}(OH)_2$) with an average particle size of approximately 10 μm. The metal hydroxide was fired in an oxygen atmosphere at 600° C. for 12 hours to prepare a metal oxide ($Ni_{0.91}CO_{0.06}Al_{0.03}O$) (second particles) with an average particle size of approximately 10 μm.

[Preparation of First Particles]

Lithium hydroxide was added as a lithium source to the metal oxide ($Ni_{0.91}CO_{0.06}Al_{0.03}O$) (second particles), and the metal oxide was then fired in an oxygen atmosphere at 700° C. for 12 hours. In this manner, a lithium transition metal oxide ($LiNi_{0.91}Co_{0.06}Al_{0.03}O_2$) (first particles) with an average particle size of approximately 10 μm was produced.

[Preparation of Mixture of First Particles and Second Particles to which Lithium Phosphate Adheres]

The second particles were dispersed in aqueous phosphoric acid (concentration: 3% by mass) to prepare a dispersion liquid of the second particles to which phosphoric acid adhered. The first particles (positive-electrode active material) were then added to the dispersion liquid and were stirred. An alkaline component (lithium) remaining on the surface of the first particles was eluted and reacted with phosphoric acid adhering to the surface of the second particles, thus forming lithium phosphate on the surface of the second particles. The mixture of the first particles and the second particles to which lithium phosphate adhered was then removed by filtration and was dried.

The total amount of metallic elements in the metal oxide (second particles) was 0.05% by mole of the total amount of metallic elements other than lithium contained in the lithium transition metal oxide.

The phosphorus content of the lithium phosphate was 0.56% by mole of the total amount of metallic elements other than lithium contained in the lithium transition metal oxide. The phosphorus content of the lithium phosphate was determined by measuring the concentration of P in the mixture by ICP spectroscopy on the assumption that lithium phosphate in the mixture adhered entirely to the second particles.

The second particles were porous and had a BET specific surface area of 46 $m^2/g$ and a sphericity of 0.89. The sphericity of the second particles was determined by the image processing of a scanning electron microscope (SEM) photograph of the second particles. The sphericities of randomly selected 100 particles were averaged.

[Preparation of Positive Electrode]

A mixture of the first particles and the second particles to which lithium phosphate adhered, acetylene black, and poly(vinylidene difluoride) were mixed at a mass ratio of 95:2.5:2.5. After the addition of N-methyl-2-pyrrolidone (NMP), the mixture was stirred with a mixer (T.K. Hivis Mix manufactured by Primix Corporation) to prepare a positive electrode slurry. The positive electrode slurry was then applied to the surface of aluminum foil, was dried, and was rolled to form a positive electrode that had a positive-electrode mixture layer with a density of 3.6 g/cm$^3$ on both sides of the aluminum foil.

[Preparation of Negative Electrode]

A graphite powder (average particle size: 20 μm), sodium carboxymethylcellulose (CMC-Na), and styrene-butadiene rubber (SBR) were mixed at a mass ratio of 97.5:1:1.5. After the addition of water, the mixture was stirred with a mixer (T.K. Hivis Mix manufactured by Primix Corporation) to prepare a negative electrode slurry. The negative electrode slurry was then applied to the surface of copper foil, was dried, and was rolled to form a negative electrode that had a negative-electrode mixture layer with a density of 1.5 g/cm$^3$ on both sides of the copper foil.

[Preparation of Non-Aqueous Electrolytic Solution]

LiPF$_6$ was dissolved at a concentration of 1.0 mol/L in a mixed solvent containing ethylene carbonate (EC) and diethyl carbonate (DEC) at a volume ratio of 3:7, thus preparing a non-aqueous electrolytic solution.

[Manufacture of Non-Aqueous Electrolyte Secondary Battery]

A tab was attached to each of the electrodes. The positive electrode and the negative electrode were wound with the separator interposed therebetween such that the tabs were located on the outermost periphery, thus forming an electrode assembly. The separator was a microporous polyethylene film 20 μm in thickness. The electrode assembly was inserted into an aluminum laminated film housing and was dried under vacuum at 105° C. for 2 hours. A non-aqueous electrolytic solution was poured into the housing, and the opening of the housing was sealed. Thus, a non-aqueous electrolyte secondary battery was completed.

Comparative Example 1

A non-aqueous electrolyte secondary battery was manufactured in the same manner as in Example 1 except that the mixture of the first particles and the second particles to which lithium phosphate adhered was replaced with the first particles in the preparation of the positive electrode.

Comparative Example 2

The first particles and the second particles were mixed without the dispersion medium. A non-aqueous electrolyte secondary battery was manufactured in the same manner as in Example 1 except that the mixture of the first particles and the second particles to which lithium phosphate adhered was replaced in the preparation of the positive electrode with the mixture of the first particles and the second particles prepared above.

Comparative Example 3

The second particles were dispersed in water to prepare a dispersion liquid of the second particles. The first particles were added to the dispersion liquid and were stirred. The mixture of the first particles and the second particles was then removed by filtration and was dried. The mixture of the first particles and the second particles was prepared in this manner.

A non-aqueous electrolyte secondary battery was manufactured in the same manner as in Example 1 except that the mixture of the first particles and the second particles to which lithium phosphate adhered was replaced in the preparation of the positive electrode with the mixture of the first particles and the second particles prepared above.

Comparative Example 4

The first particles (positive-electrode active material) were added to aqueous phosphoric acid and were stirred. An alkaline component (lithium) remaining on the surface of the first particles is eluted and reacted with phosphoric acid in the aqueous solution, thus forming lithium phosphate. The lithium phosphate adhered to the surface of the first particles. The first particles to which the lithium phosphate adhered were then removed by filtration and were dried.

A non-aqueous electrolyte secondary battery was manufactured in the same manner as in Example 1 except that the mixture of the first particles and the second particles to which lithium phosphate adhered was replaced in the preparation of the positive electrode with the first particles to which the lithium phosphate adhered.

The batteries according to the example and comparative examples were subjected to the following evaluation.

[Evaluation]

(A) Initial Discharge Capacity

Constant-current charging at an electric current of 1 It (800 mA) to a voltage of 4.2 V was followed by constant-voltage charging at a constant voltage of 4.2 V to an electric current of 1/20 It (40 mA). The charging was followed by 10-minute rest. Constant-current discharging was then performed at an electric current of 1 It (800 mA) to a voltage of 2.5 V.

(B) Capacity Retention Rate after High-Temperature Storage

In each battery, constant-current charging at an electric current of 1 It (800 mA) to a voltage of 4.2 V was followed by constant-voltage charging at a constant voltage of 4.2 V to an electric current of 1/20 It (40 mA). Each battery after charging was stored at 85° C. for 12 hours.

Each battery after storage was subjected to constant-current discharging at an electric current of 1 It (800 mA) to a voltage of 2.5 V.

The capacity retention rate was calculated from the initial discharge capacity determined in (A) and the discharge capacity after storage using the following formula.

Capacity retention rate (%)=(discharge capacity after storage)/(initial discharge capacity)×100

(C) Amount of Heat Generation

In each battery, constant-current charging at an electric current of 1 It (800 mA) to a voltage of 4.2 V was followed by constant-voltage charging at a constant voltage of 4.2 V to an electric current of 1/20 It (40 mA). Each battery after charging was disassembled, and a positive electrode was removed from the battery and was dried at normal temperature for approximately 1 hour. The amount of heat generation at high temperatures (when heated to 300° C.) was measured by differential scanning calorimetry (DSC).

(D) Amount of Gas Evolution During High-Temperature Storage

In each battery, constant-current charging at an electric current of 1.0 It (800 mA) to a voltage of 4.2 V was followed by constant-voltage charging at a voltage of 4.2 V to an electric current of 1/20 It (40 mA). Each battery after charging was left to stand at 85° C. for 12 hours.

The density of each battery after charging (before left to stand) and after left to stand was measured by the Archimedes' principle, and the amount of gas evolution was determined from the amount of change in the density of the battery.

Table 1 shows the evaluation results. The second particle content (% by mole) in Table 1 is the total amount of metallic element in the metal oxide (second particles) relative to the total amount of metallic elements other than lithium contained in the lithium transition metal oxide. The lithium phosphate content (% by mole) is the amount of lithium phosphate relative to the total amount of metallic elements other than lithium contained in the lithium transition metal oxide. The same applies to the second particle content and the lithium phosphate content in Tables 2 and 3 described later.

TABLE 1

|  | Dispersion medium for second particles | Second particle content (mol %) | Lithium phosphate content (mol %) | Initial discharge capacity (mAh/g) | Capacity retention rate after high-temperature storage (%) | Amount of gas evolution during high-temperature storage (cc/g) | Amount of heat generation (mW/g) |
|---|---|---|---|---|---|---|---|
| Comparative example 1 | — | — | — | 197.1 | 88.3 | 1.30 | 391.5 |
| Comparative example 2 | — | 0.05 | — | 195.2 | 88.8 | 1.30 | 352.7 |
| Comparative example 3 | Water | 0.05 | — | 196.0 | 88.2 | 0.97 | 318.3 |
| Comparative example 4 | — | — | 0.56 | 196.2 | 89.4 | 0.71 | 375.2 |
| Example 1 | Aqueous phosphoric acid | 0.05 | 0.56 | 197.5 | 91.3 | 0.60 | 189.9 |

The battery according to Example 1 had an increased capacity retention rate after high-temperature storage. This is because the second particles to which lithium phosphate adhered decreased the degradation of the positive-electrode active material during high-temperature storage.

In the battery according to Example 1, the amount of heat generated by heating the positive electrode after charging was decreased.

In the battery according to Example 1, the amount of gas evolution during high-temperature storage was decreased. This is because an alkaline component remaining on the surface of the first particles was removed by elution during the formation of lithium phosphate. This is also because an alkaline component remaining on the surface of the first particles was incorporated into the interior (pores) of the second particles.

By contrast, in the batteries according to Comparative Examples 1 to 4, the lack of the second particles to which lithium phosphate adhered resulted in a decrease in the capacity retention rate after high-temperature storage and an increase in the amount of heat generated by heating the positive electrode after charging.

In the battery according to Comparative Example 3, because an alkaline component remaining on the surface of the first particles was incorporated into the interior (pores) of the second particles, the amount of gas evolution was decreased compared with Comparative Example 1 but was increased compared with the battery according to Example 1. The first particles and the second particles were not uniformly mixed together in Comparative Example 2. Thus, the amount of gas evolution was larger in Comparative Example 2 than in Comparative Example 3.

In the battery according to Comparative Example 4, when the first particles were added to aqueous phosphoric acid, an alkaline component remaining on the surface of the first particles was used to form lithium phosphate, and therefore the amount of gas evolution during high-temperature storage was decreased. However, in the battery according to Comparative Example 4, in which lithium phosphate adhered to the first particles, lithium phosphate was not selectively reduced, and the positive-electrode active material was also reduced. Thus, the capacity retention rate after high-temperature storage was decreased.

Examples 2 to 6

A non-aqueous electrolyte secondary battery was manufactured and examined in the same manner as in Example 1 except that the second particle content (based on the total amount of metallic elements contained in the metal oxide relative to the total amount of metallic elements other than lithium contained in the lithium transition metal oxide) was listed in Table 2. Table 2 shows the evaluation results.

TABLE 2

|  | Dispersion medium for second particles | Second particle content (mol %) | Lithium phosphate content (mol %) | Initial discharge capacity (mAh/g) | Capacity retention rate after high-temperature storage (%) | Amount of gas evolution during high-temperature storage (cc/g) | Amount of heat generation (mW/g) |
|---|---|---|---|---|---|---|---|
| Example 2 | Aqueous phosphoric acid | 0.005 | 0.56 | 196.8 | 90.1 | — | — |
| Example 3 | Aqueous phosphoric acid | 0.02 | 0.56 | 197.4 | 90.5 | 0.64 | 247.3 |

TABLE 2-continued

|  | Dispersion medium for second particles | Second particle content (mol %) | Lithium phosphate content (mol %) | Initial discharge capacity (mAh/g) | Capacity retention rate after high-temperature storage (%) | Amount of gas evolution during high-temperature storage (cc/g) | Amount of heat generation (mW/g) |
|---|---|---|---|---|---|---|---|
| Example 1 | Aqueous phosphoric acid | 0.05 | 0.56 | 197.5 | 91.3 | 0.60 | 189.9 |
| Example 4 | Aqueous phosphoric acid | 0.1 | 0.56 | 198.1 | 91.2 | 0.68 | 204.8 |
| Example 5 | Aqueous phosphoric acid | 0.5 | 0.56 | 197.8 | 91.0 | 0.71 | 277.7 |
| Example 6 | Aqueous phosphoric acid | 2 | 0.56 | 192.3 | 90.8 | 0.73 | 292.5 |

Examples 1 and 3 to 5, in which the total amount of metallic elements in the metal oxide ranged from 0.01% to 0.5% by mole of the total amount of metallic elements other than lithium contained in the lithium transition metal oxide, had high initial capacities and high capacity retention rates after high-temperature storage.

Examples 7 to 11

The concentration of aqueous phosphoric acid used for the preparation of the mixture of the first particles and the second particles to which lithium phosphate adhered and the amount of lithium hydroxide (lithium source) used to form the first particles were changed to adjust the lithium phosphate content (based on the phosphorus content of the lithium phosphate relative to the total amount of metallic elements other than lithium contained in the lithium transition metal oxide) to be the value listed in Table 3. Except for these, a non-aqueous electrolyte secondary battery was manufactured and examined in the same manner as in Example 1. Table 3 shows the evaluation results.

TABLE 3

|  | Dispersion medium for second particles | Second particle content (mol %) | Lithium phosphate content (mol %) | Initial discharge capacity (mAh/g) | Capacity retention rate after high-temperature storage (%) | Amount of gas evolution during high-temperature storage (cc/g) | Amount of heat generation (mW/g) |
|---|---|---|---|---|---|---|---|
| Example 7 | Aqueous phosphoric acid | 0.05 | 0.005 | 199.6 | 90.0 | — | — |
| Example 8 | Aqueous phosphoric acid | 0.05 | 0.01 | 198.5 | 90.7 | 0.70 | 270.9 |
| Example 9 | Aqueous phosphoric acid | 0.05 | 0.03 | 199.5 | 90.7 | 0.71 | 210.6 |
| Example 1 | Aqueous phosphoric acid | 0.05 | 0.56 | 197.5 | 91.3 | 0.60 | 189.9 |
| Example 10 | Aqueous phosphoric acid | 0.05 | 0.75 | 195.6 | 91.8 | 0.65 | 192.4 |
| Example 11 | Aqueous phosphoric acid | 0.05 | 1.20 | 187.0 | 92.4 | 0.67 | 201.0 |

Examples 1 and 8 to 10, in which the phosphorus content of lithium phosphate adhering to the second particles ranged from 0.01% to 1% by mole of the total amount of metallic elements other than lithium contained in the lithium transition metal oxide, had high initial capacities and high capacity retention rates after high-temperature storage.

INDUSTRIAL APPLICABILITY

A non-aqueous electrolyte secondary battery according to the present invention is useful as a main power supply in mobile communication devices, portable electronic devices, and the like.

REFERENCE SIGNS LIST 4 frame
5 sealing plate
6 battery case
9 electrode assembly
11 negative-electrode lead
13 negative-electrode terminal
14 positive-electrode lead

The invention claimed is:

1. A positive electrode for a non-aqueous electrolyte secondary battery, comprising:
a first particle and a second particle,
wherein the first particle contains an electrochemically active positive-electrode active material,
the positive-electrode active material contains a lithium transition metal oxide,
the second particle is an electrochemically inactive metal oxide,
an electrochemically inactive phosphate adheres to a surface of the second particle, a Ni content of the lithium transition metal oxide is 80% or more by mole of a total amount of metallic elements other than lithium contained in the lithium transition metal oxide, and the lithium transition metal oxide and the inactive metal oxide contain the same transition metal as a main component.

2. The positive electrode for a non-aqueous electrolyte secondary battery according to claim 1, wherein the phosphate includes lithium phosphate.

3. The positive electrode for a non-aqueous electrolyte secondary according to claim 1, wherein the inactive metal oxide contains Ni.

4. The positive electrode for a non-aqueous electrolyte secondary battery according to claim 3, wherein a Ni content of the inactive metal oxide is 80% or more by mole of a total amount of metallic elements contained in the inactive metal oxide.

5. The positive electrode for a non-aqueous electrolyte secondary battery according to claim 1, wherein the total amount of metallic elements in the inactive metal oxide ranges from 0.01% to 0.5% by mole of the total amount of metallic elements other than lithium contained in the lithium transition metal oxide.

6. The positive electrode for a non-aqueous electrolyte secondary battery according to claim 1, wherein a phosphorus content of the phosphate ranges from 0.01% to 1% by mole of the total amount of metallic elements other than lithium contained in the lithium transition metal oxide.

7. A non-aqueous electrolyte secondary battery comprising: the positive electrode according to claim 1; a negative electrode; and a non-aqueous electrolyte.

8. The positive electrode for a non-aqueous electrolyte secondary battery according to claim 1, wherein the second particle has a BET specific surface area in the range of 10 to 100 $m^2/g$, and the second particle has a sphericity of 0.8 or more.

9. The positive electrode for a non-aqueous electrolyte secondary battery according to claim 1, wherein an average particle size P1 of the first particles and an average particle size P2 of the second particles satisfy the following relational expression:

$$0.8 \leq P2/P1 \leq 1.2.$$

* * * * *